E. D. PIGGOTT.
LOCK NUT.
APPLICATION FILED MAY 4, 1915.
1,169,864.
Patented Feb. 1, 1916.
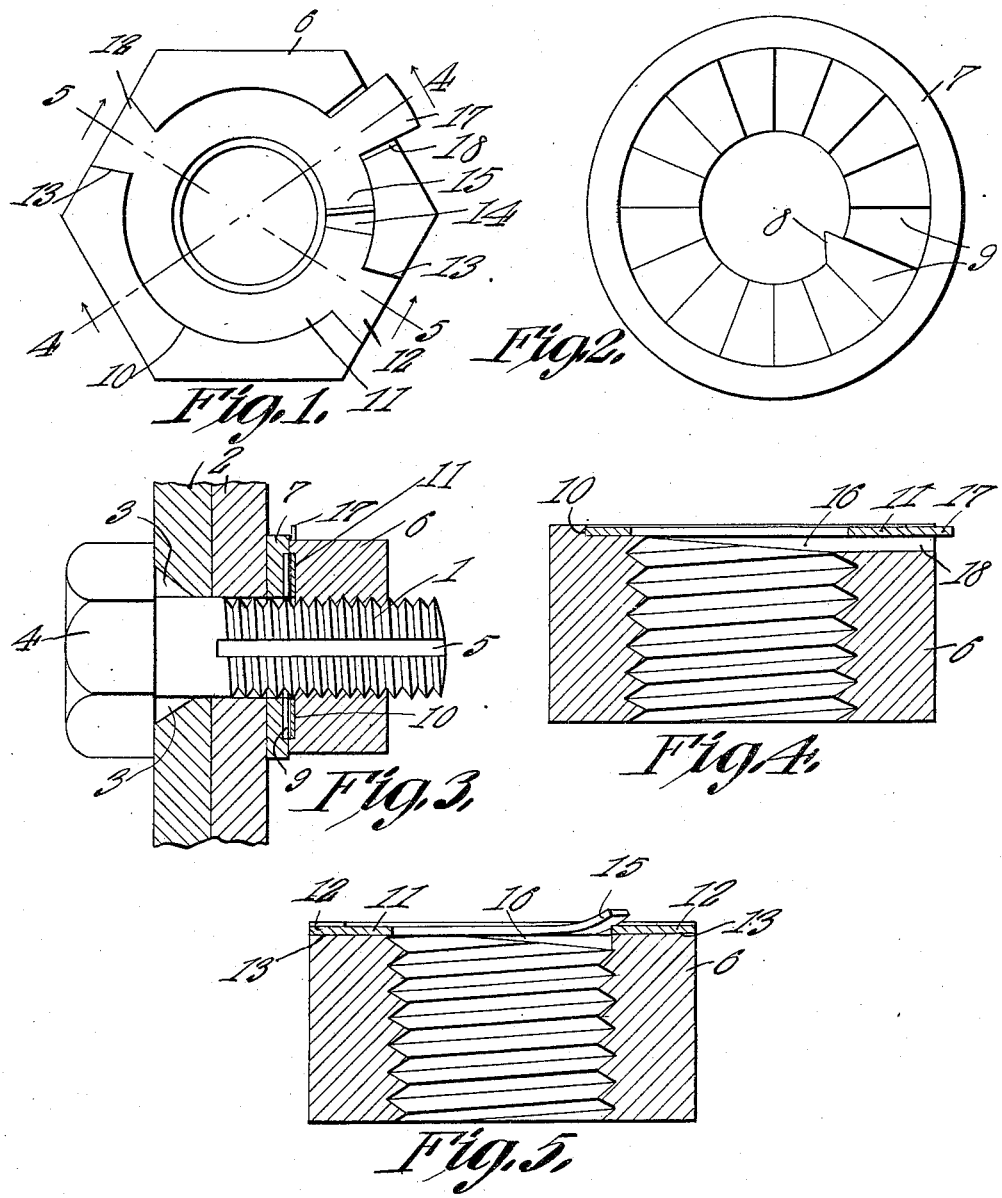
Witnesses
E. D. Piggott,
Inventor
by C. A. Snow & Co.
Attorneys

UNITED STATES PATENT OFFICE.

ENOCH D. PIGGOTT, OF PARKERSBURG, WEST VIRGINIA.

LOCK-NUT.

1,169,864.  Specification of Letters Patent.  Patented Feb. 1, 1916.

Application filed May 4, 1915. Serial No. 25,780.

*To all whom it may concern:*

Be it known that I, ENOCH D. PIGGOTT, a citizen of the United States, residing at Parkersburg, in the county of Wood and State of West Virginia, have invented a new and useful Lock-Nut, of which the following is a specification.

The present invention appertains to nut locks, and aims to provide novel and improved, yet simple, inexpensive and effective means for preventing the retrograde movement of a nut when threaded into place upon a bolt.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a face view of the nut. Fig. 2 is a face view of the washer used in connection with the nut. Fig. 3 is a sectional view of the nut and washer as in use, said view being on a reduced scale. Fig. 4 is an enlarged sectional view of the nut taken on the line 4—4 of Fig. 1. Fig. 5 is another enlarged sectional view of the nut taken on the line 5—5 of Fig. 1.

In the drawing, there is illustrated a bolt 1 engaged through the members or objects 2 which are to be clamped together, and the bolt 1 is provided with webs 3 between its shank and its head 4, whereby the webs 3 in entering the respective member or object 2, will prevent the bolt 1 from rotating. The threaded portion of the bolt 1 is provided with a longitudinal key way 5. A nut 6 is adapted to be threaded upon the bolt 1 in the usual manner, and a washer 7 is preferably slipped onto the bolt 1 so as to be disposed between the nut 6 and respective member or object 2 whereby the nut bears against the washer. The washer 7 has a key 8 to engage the key way or groove 5 of the bolt, to prevent the washer from rotating with respect to the bolt, and the face of the washer 7 is provided with an annular series of ratchet teeth 9 with which the pawl or dog of the nut engages.

The face of the nut 6 is provided with an annular rabbet 10 surrounding the bore of the nut, and a split sheet metal ring 11 is seated snugly within the rabbet 10, and is provided at diametrically opposite portions with dove-tailed lugs 12 which fit in dove-tailed recesses 13 provided in the face of the nut between the rabbet 10 and the respective opposite sides of the nut. The lugs 12 in fitting in the recesses 13, hold the ring 11 in place, and prevent the same from turning with respect to the nut. The ring 11 is split, as at 14, adjacent one of the lugs 12, and that end portion of the ring 11 remote from the said lug 12, is bent or curved slightly away from the face of the nut 6 to provide a spring pawl or dog 15 which is engageable with the ratchet teeth 9 of the washer 7. The ring 11 is provided with a radially projecting finger piece 17 adjacent the end of the pawl 15, and the face of the nut 6 is provided with a radial slot 18 extending from the rabbet 10 to the respective side of the nut whereby the finger piece 17 projects through the slot 18 and is accommodated thereby. The finger piece 17 projects slightly from the margin of the nut, and the slot 18 is sufficiently deep, and the adjacent portion of the rabbet 10 is also sufficiently deepened, as at 16, to allow the pawl 15 to be retracted by means of the finger piece 17, when it is desired to release the nut manually.

In use, when the washer 7 is properly slipped onto the bolt, and the nut 6 then threaded onto the bolt so as to bear against the washer 7, the pawl 15 will engage the ratchet teeth 9 of the washer, in order that when the nut 6 is tightened, the pawl 15 will prevent the retrograde movement of the nut, and the nut is therefore prevented from unscrewing accidentally by the shocks or vibrations to which the device is subjected. When it is desired to release the nut, the pawl 15 may be released by moving the finger piece 17 in the proper direction to retract the pawl 15 away from the ratchet teeth 9, and the nut may then be unscrewed readily.

The locking or pawl device is assembled with the nut in a simple and efficient manner, and serves its office effectively.

What is claimed is:

1. In a device of the character described, a nut having an annular rabbet surrounding its bore, a split ring secured within said rabbet and having one end bent to form a pawl, said ring having a radially projecting finger piece adjacent said pawl, and the nut having a slot for accommodating said finger piece, the rabbet being deepened adjacent said slot and said slot being sufficiently deep whereby the finger piece may be actuated for retracting the pawl.

2. In a device of the character described, a nut having an annular rabbet surrounding its bore, and a split sheet metal ring fitting in said rabbet, the nut having diametrically opposite dove-tailed recesses extending from the rabbet to opposite sides of the nut, the ring having dove-tailed lugs fitting in said recesses, the ring being split adjacent one of said lugs, and that end portion of the ring remote from said lug being curved to form a spring pawl, the ring having a radially projecting finger piece adjacent the pawl, the nut having a slot for accommodating said finger piece, the rabbet being deepened adjacent said slot and said slot being sufficiently deep whereby the finger piece may be actuated for retracting said pawl.

In testimony that I claim the foregoing as my own, I have hereto affixed my signature in the presence of two witnesses.

ENOCH D. PIGGOTT.

Witnesses:
C. S. PIFER,
BESSIE PIFER.

Copies of this patent may be obtained for five cents each, by addressing the "Commissioner of Patents, Washington, D. C."